April 23, 1940.  H. C. PIERLE ET AL  2,198,090
TAPER ATTACHMENT FOR LATHES
Filed Sept. 3, 1938  8 Sheets-Sheet 4
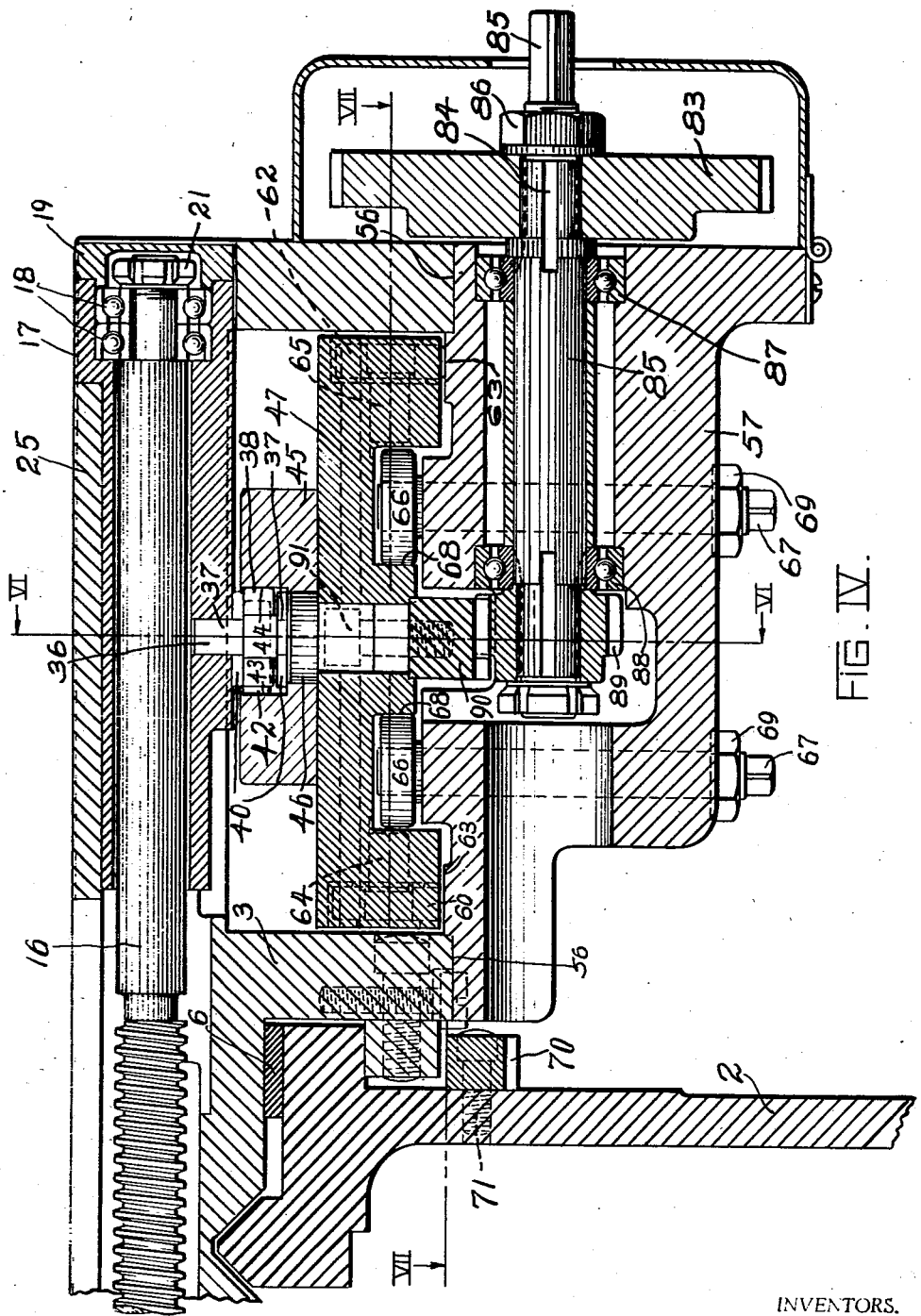
FIG. IV.
WITNESS.
Elmer R Shipley
INVENTORS.
HENRY C. PIERLE
WILLIAM F. GROENE
BY Willard S. Groene
ATTORNEY.

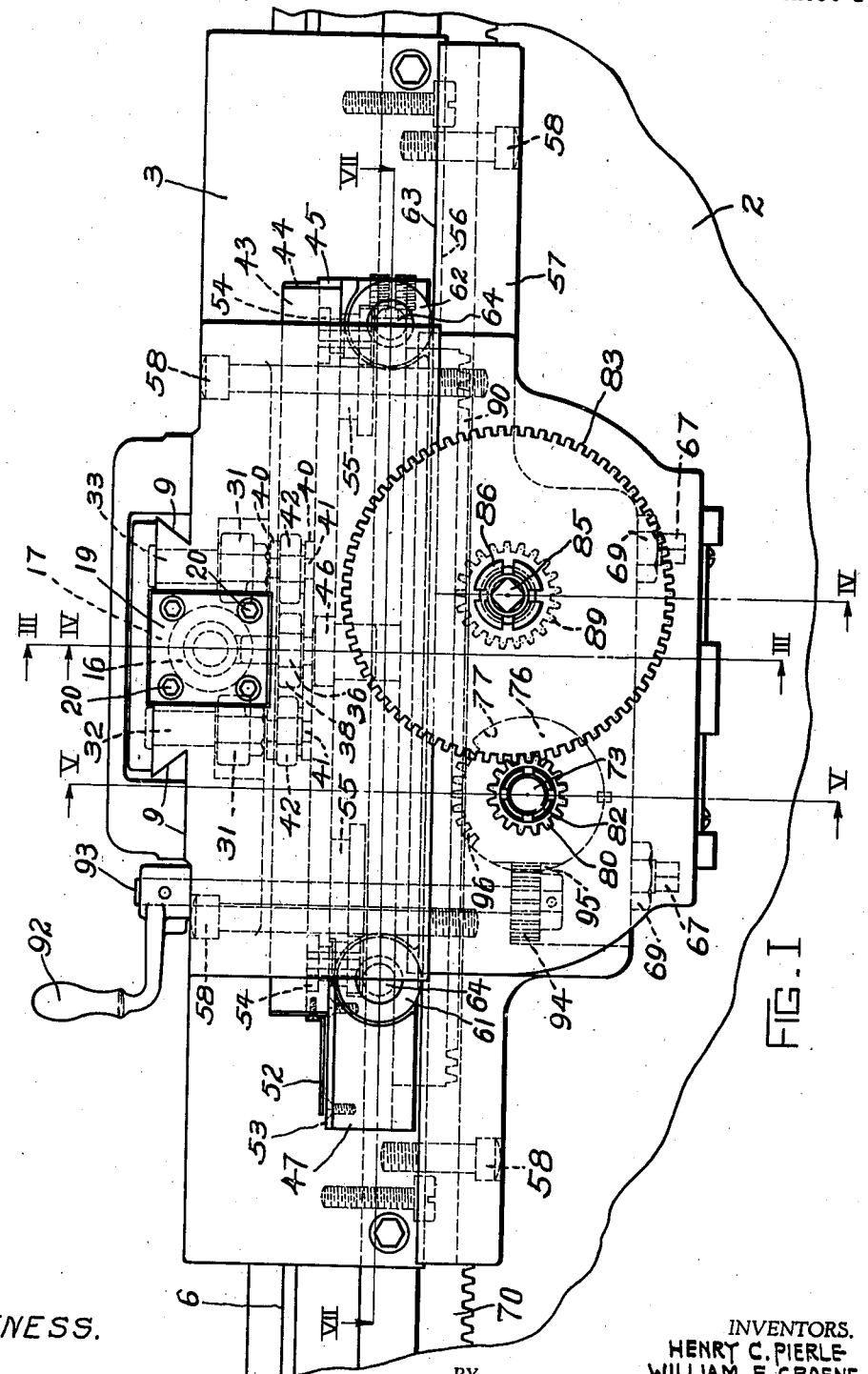

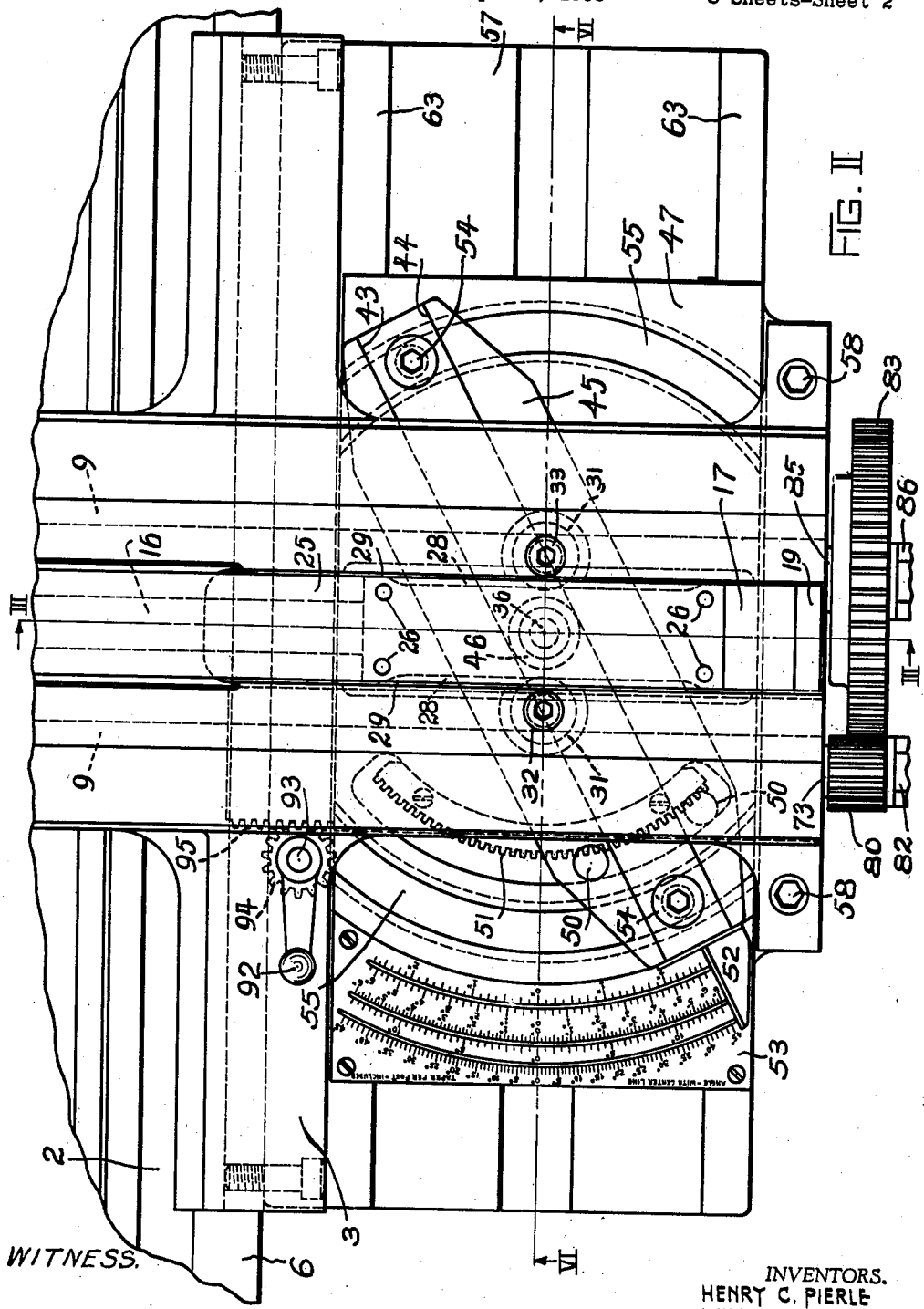

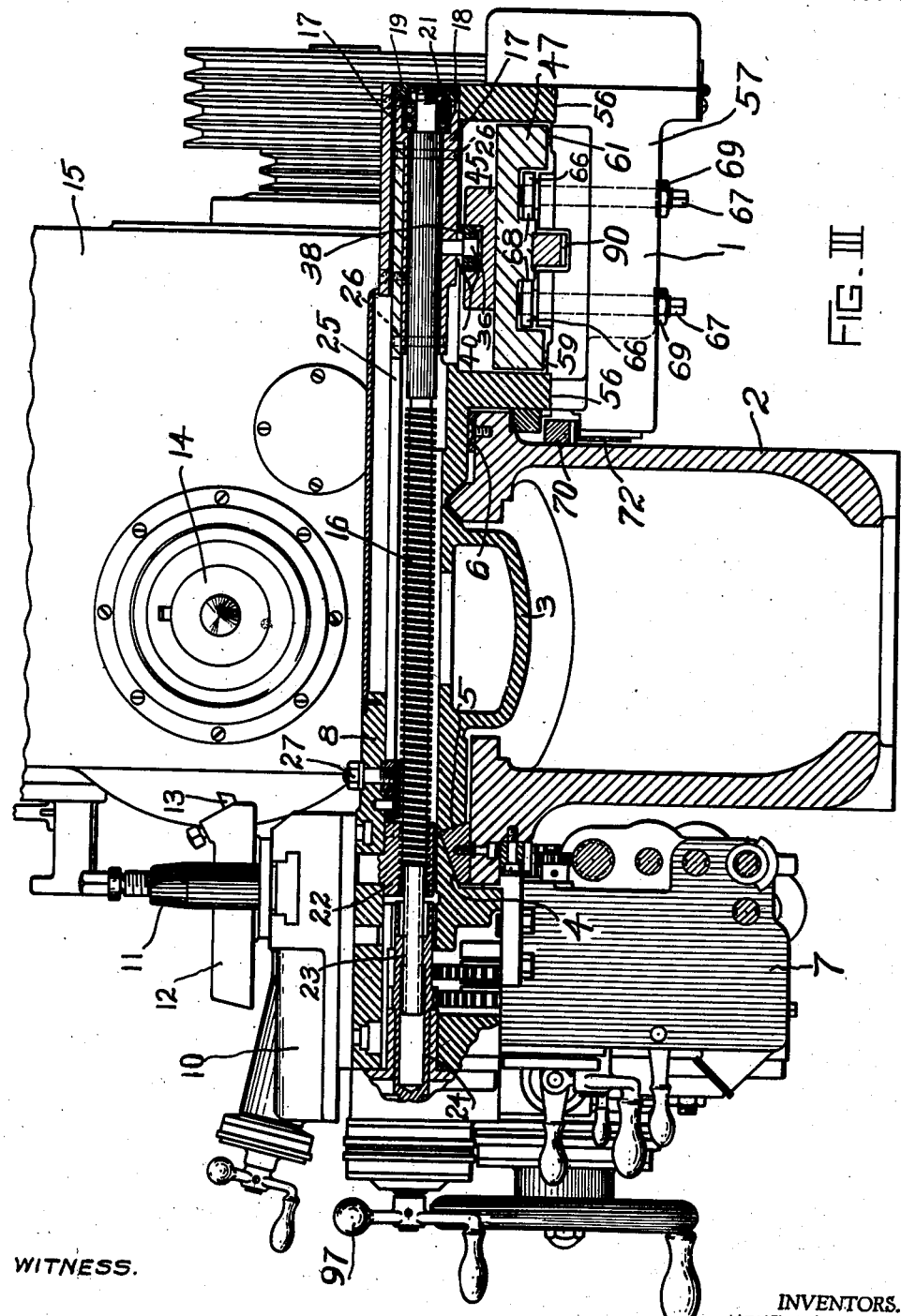

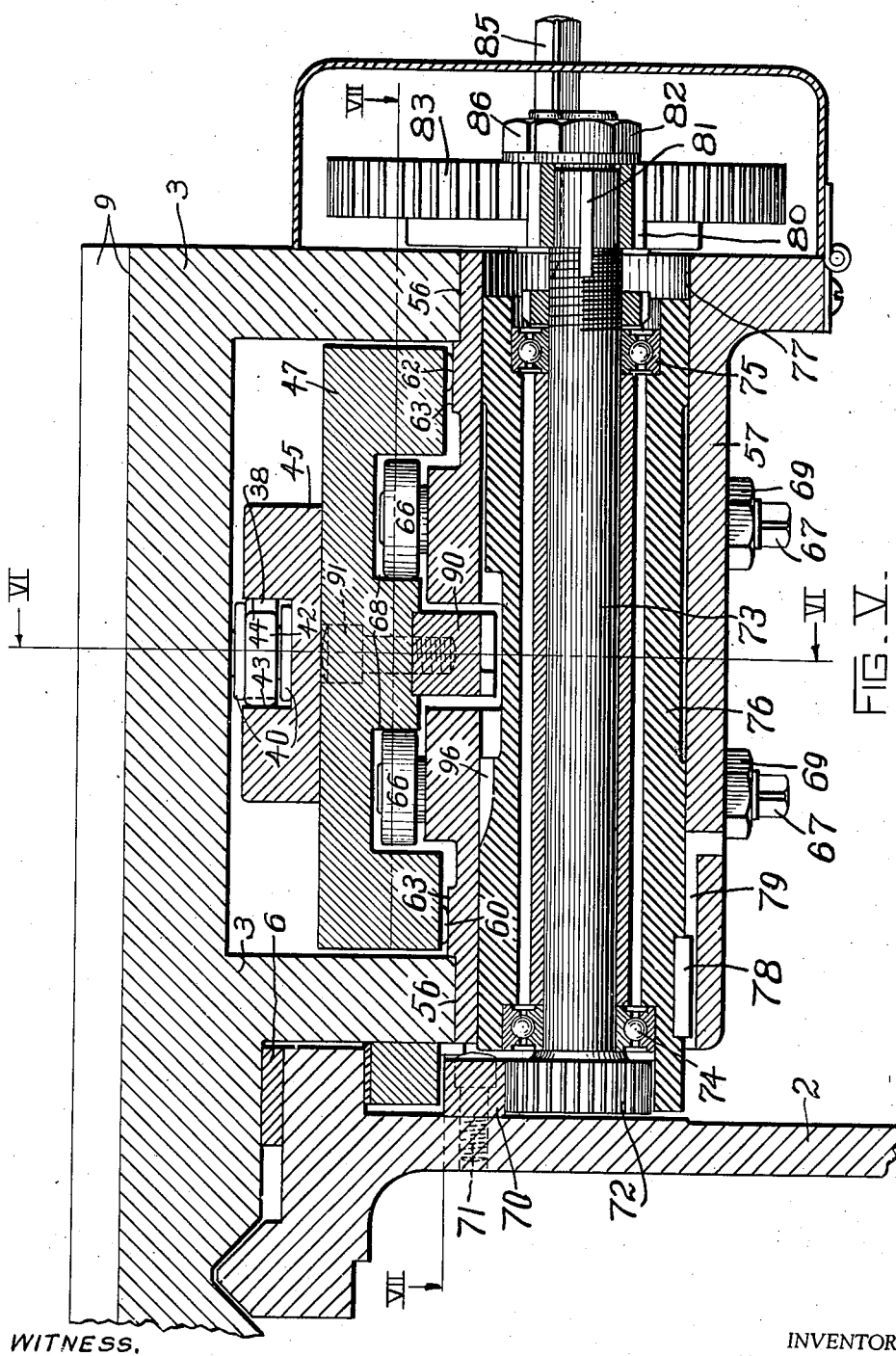

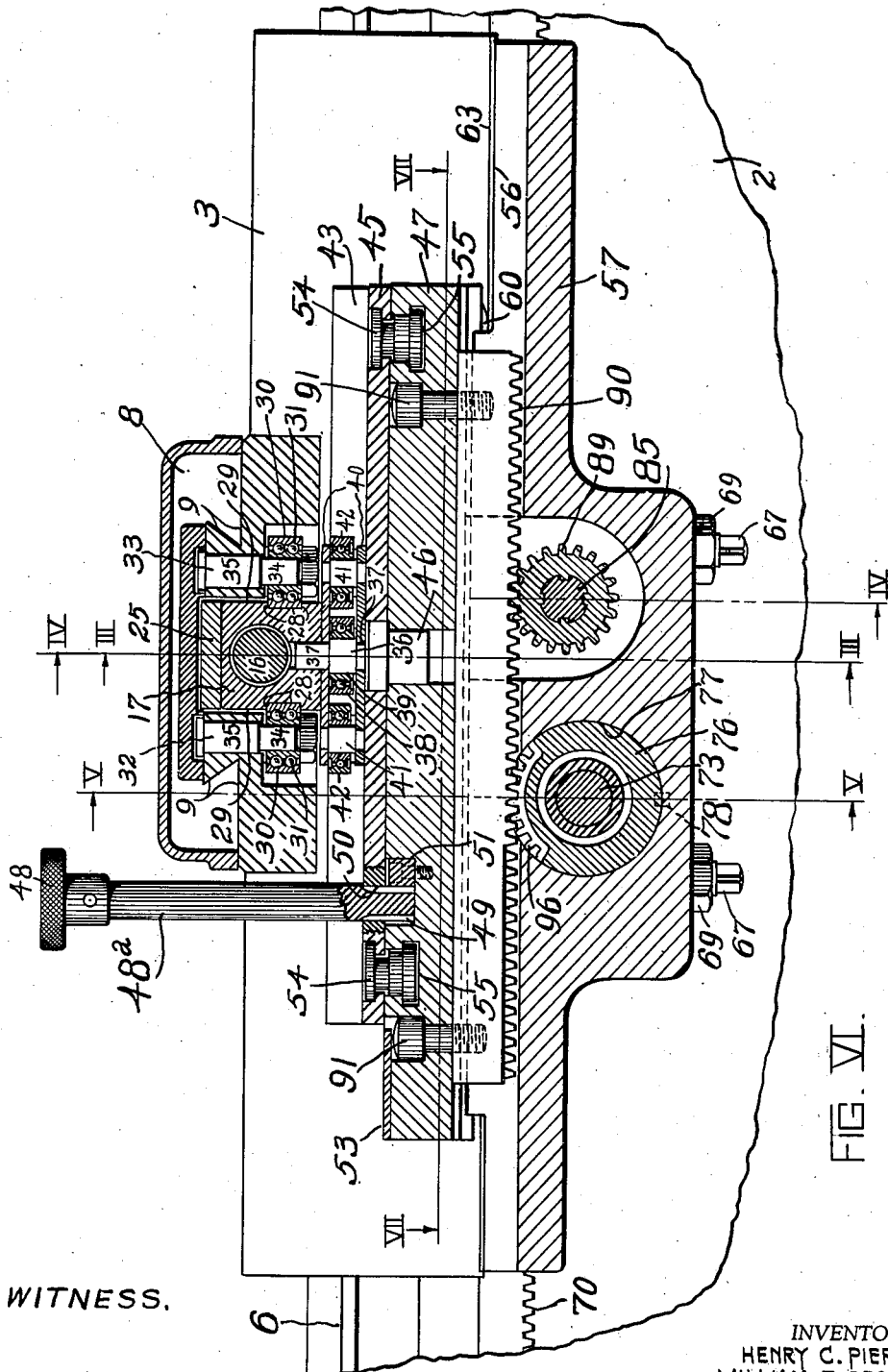
FIG. VI.

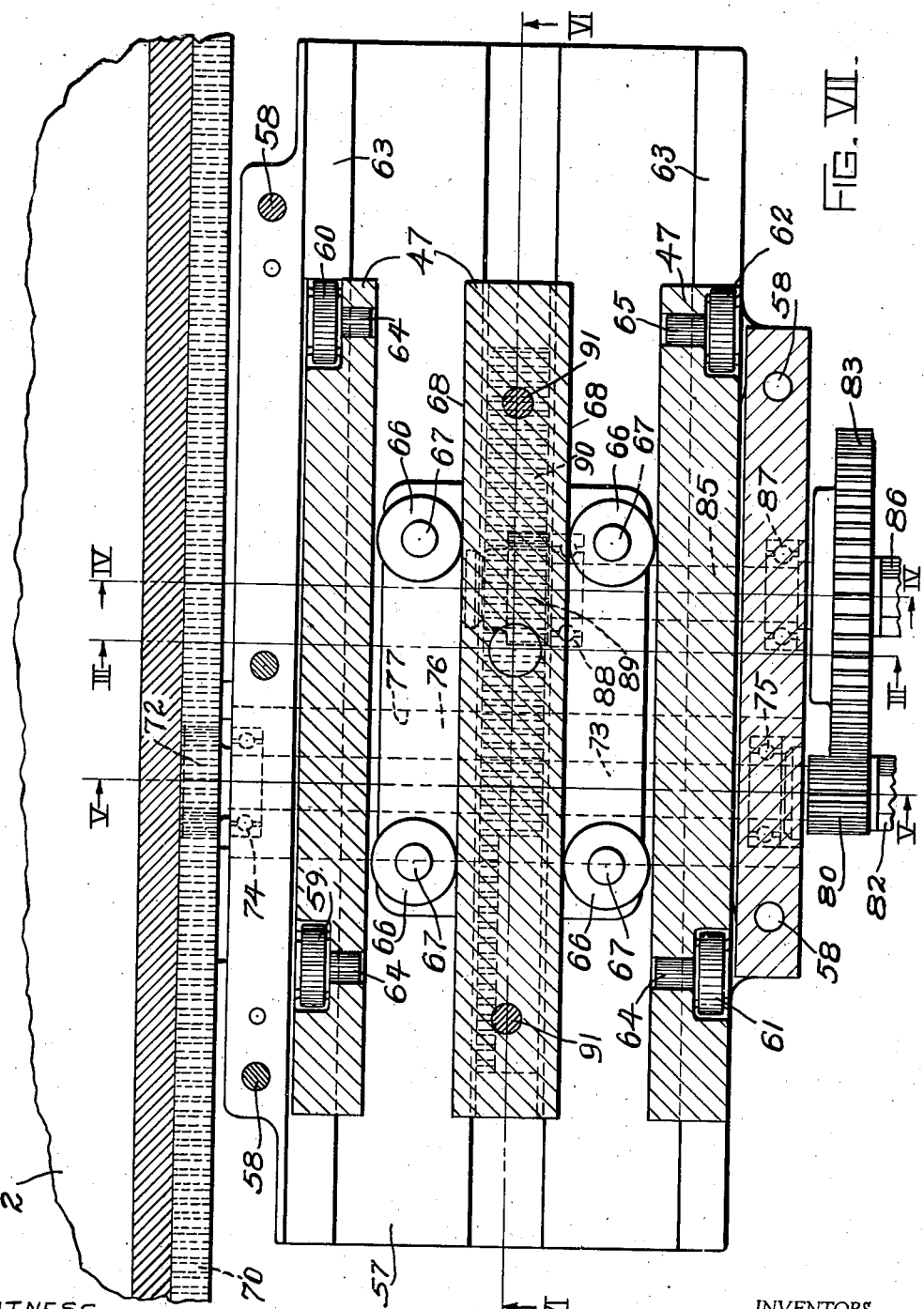

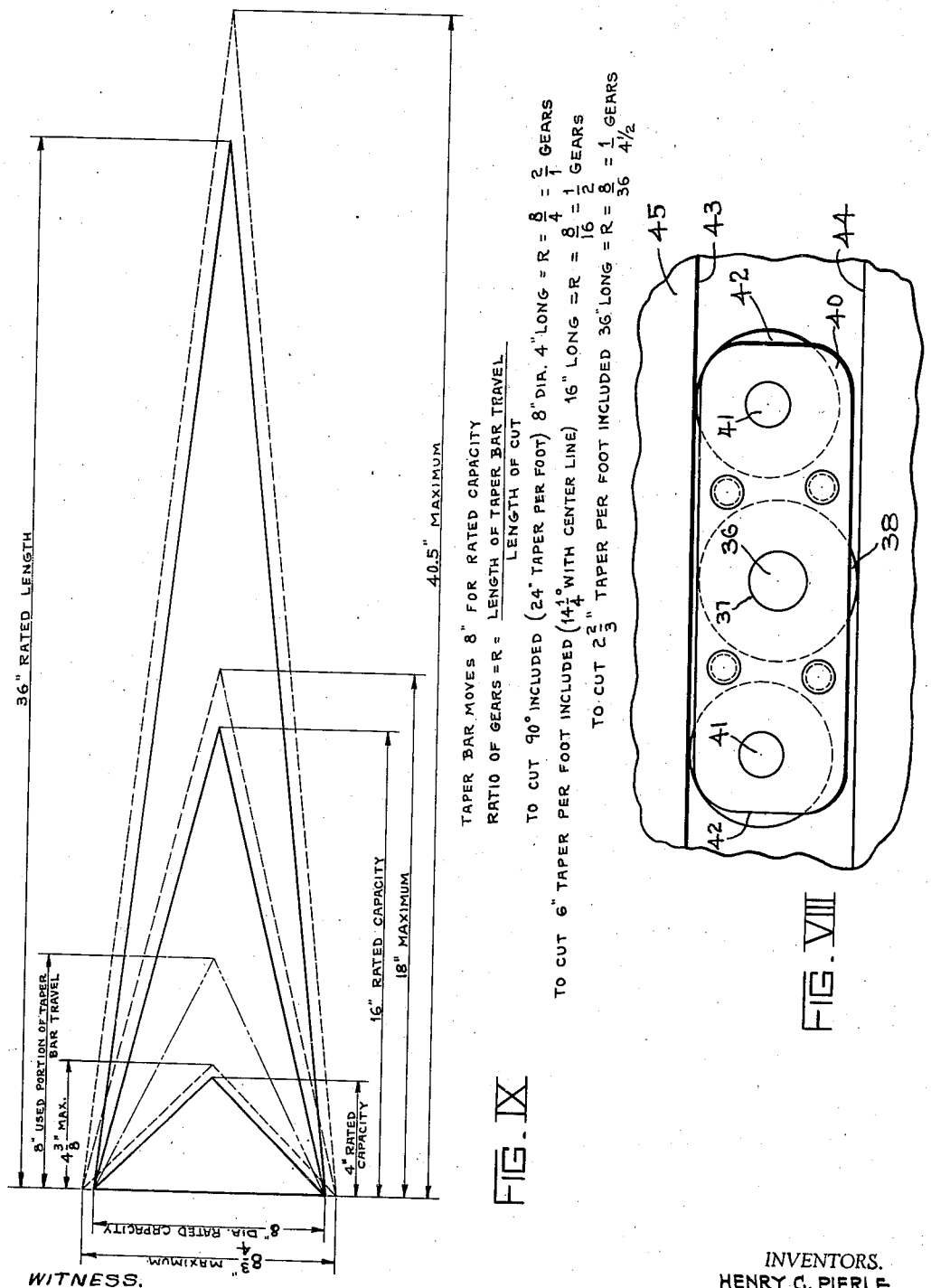

Patented Apr. 23, 1940

2,198,090

UNITED STATES PATENT OFFICE 2,198,090

TAPER ATTACHMENT FOR LATHES

Henry C. Pierle and William F. Groene, Cincinnati, Ohio, assignors to The R. K. Le Blond Machine Tool Company, Cincinnati, Ohio, a corporation of Delaware Application September 3, 1938, Serial No. 228,297

8 Claims. (Cl. 82—17)

This invention pertains to lathes, and more particularly to the type of lathes known as engine lathes, which are adapted to turn tapered surfaces on work held in such lathes. Further, this invention pertains specifically to taper attachments for such lathes for actuating the carriage and cross slide in such a manner that tapered surfaces may be machined on work pieces.

Heretofore, the angles at which tapers have been cut in lathes have generally been determined by guide bars or equivalent devices, or by setting the tailstock out of alignment with the headstock, or by connecting the cross feed with the longitudinal feed by means of gearing and by varying the angle of taper by substituting gear wheels of different ratios. In the first and second cases mentioned it is impossible to cut anything but small tapers.

In the first instance when deeper tapers are attempted to be cut by means of the guide bar, the frictional engagement of the actuating member for operating the cross slide is so great against the steeply set angle of the guide bar as to cause damage to the machine and distortion and irregularity in the work to such an extent as to make this method practically unworkable.

Obviously, in the second instance, that of setting the tailstock out of alignment with the headstock, the limitations there obviously result in the amount by which the tailstock could practically be offset from the bed and still maintain proper engagement of the centers with the work piece.

In the third case tapers of only a comparatively few angles can be cut, as practically an infinite number of variety of sizes of gear wheels would be needed to obtain the proper ratio to cut such angles. Moreover, in the second and third cases, it is difficult if not impossible to obtain different angles with sufficient approximation to answer ordinary practical purposes without considerable expensive preliminary experimenting.

In the past these difficulties have been partially but unsatisfactorily overcome by providing a differential drive to the taper attachment slide carrying the angularly adjustable guide bar, in that the actuating slide for this guide bar was moved through suitable actuating means at a different speed than the longitudinal feeding speed of the carriage along the bed so as to provide a differential in speeds between this slide and the carriage to effect a wider range of tapers with the use of a relatively short guide bar. The inherent difficulty of the frictional engagement of the actuating means for the cross slide and the guide bar were still involved in this older method.

Therefore, one of the chief objects of the present invention is to provide an anti-friction arrangement associated with the angularly positioned guide bar whereby it may be set at a relatively steep angle and still not set up frictional strains which will damage the carriage and cross slide mechanism and cause irregular and jumpy movement of the cross slide and longitudinal slide in cutting steep tapers. This we have accomplished by utilizing a series of anti-friction ball bearings so positioned and so related to one another as to provide a substantially anti-friction mounting for the taper attachment slide or truck and the guide shoe riding in the guide bar and in which arrangement there is no backlash or shake so that when the taper attachment is operating there is no backlash between the cross slide and said taper attachment. This feature also is utilized to securely hold the cross slide actuating screw in proper alignment to the lathe carriage and cross slide when the taper attachment is placed in operating condition.

The differential operation of the taper attachment slide relative to the carriage has been accomplished in the past by means of mechanism exterior of the taper attachment itself. This exterior mechanism was mounted by a suitable bed bracket which had to be moved along the bed of the lathe where needed for each particular job. The mechanism for creating the differential movement above mentioned has generally been carried in this separate and independent bracket in the nature of a variator mechanism containing change gears which were actuated through racks, one of which was attached to the lathe carriage and the other to the slide of the taper attachment.

This construction has several inherent disadvantages: first, requiring of additional mechanism in the nature of an independent and separate bracket; second, this bracket, which is not a part of the taper attachment, must be moved along the bed to suit each different job which requires a different position for the carriage and its taper attachment; and third, with this arrangement the application of force to the taper attachment as applied by the movement of the carriage is effected at a point far removed from the contact of the carriage with the shear on the bed so as to cause undue spring and strain in the carriage frame particularly when effecting heavy cuts on steep taper work.

One object of our invention is to secure an arrangement by which a maximum transverse movement of the cross slide is secured without the necessity of adjusting the guide bar to such a degree as to interfere with the free movement of the actuating member for the cross slide on the guide bar.

Another object of this invention is to render available a taper attachment mechanism of a relatively simple character and so adjustable as to be in the nature of a universal arrangement enabling the operator without the loss of time in setting additional pieces of apparatus along the bed or in the mechanism itself to effect a setting of the taper attachment for cutting tapers within a relatively wide range.

Another object of this invention is to devise a compact taper attachment well within the confines of the width of the lathe carriage in which, notwithstanding the use of a relatively short taper attachment slide or truck and guide bar, it will be possible to easily cut tapers of any length within the complete range of the bed of the lathe.

A still further object is to render available a taper attachment for the carriage of a lathe of such a character that very steep tapers may be made with heavy cuts without imposing on the carriage and cross slide strains tending to twist the carriage at an angle to the ways of the lathe and thus tend to develop inaccuracies in the work and damage to the carriage.

Another object is to provide a taper attachment of a character in which the guide bar may be rapidly set for any desired angle within the range of the lathe by quick inspection of a simplified index plate which automatically shows both the angle with the center line to be cut on the work or the taper per foot in inches of the work piece to be cut.

Another object of this invention is to provide in conjunction with a simplified taper attachment all mechanism necessary for cutting taper of any range between 0° and 90° throughout the entire capacity of the lathe and for any position along the lathe bed without the necessity of any supplementary apparatus operating therewith.

Another object of this invention is to provide in the taper attachment for lathes, a guide bar and an anti-friction actuating shoe operating in the guide bar which is provided with a preloaded feature so that no shake or backlash exists between said members.

Another object is to provide in a taper attachment for lathe means for simultaneously disconnecting the source of power for actuating the taper attachment slide or truck and locking said slide positively to the carriage of the lathe.

Further features and advantages of this invention will appear in the detailed description of the drawings in which:

Figure I is a rear elevation of a lathe carriage showing the taper attachment of this invention mounted thereon.

Figure II is a plan view of the taper attachment of Figure I shown with the cross slide of the lathe carriage removed.

Figure III is a vertical transverse cross section through a typical engine lathe on the line III—III of Figures I, II, VI, and VII, particularly showing the relationship of the taper attachment to the lathe, carriage, cross slide and apron mechanism.

Figure IV is a vertical transverse section through the taper attachment on the line IV—IV of Figure I, VI, and VII.

Figure V is a vertical transverse section through the taper attachment on the line V—V of Figures I, VI and VII.

Figure VI is a vertical section taken parallel with the bed of the lathe through the taper attachment on the line VI—VI of Figures II, IV, V and VII.

Figure VII is a horizontal section through the taper attachment on the line VII—VII of Figures I, IV, V and VI.

Figure VIII is an enlarged plan view of the anti-friction guide bar follower particularly showing the arrangement of the ball bearing rollers for obtaining the preloading characteristics of this member.

Figure IX is a diagrammatic showing of an illustrative example of a typical arrangement for a lathe showing the capacity and adaptability of this taper attachment for a specific set of conditions and size of lathe.

Referring particularly to Figure III, the taper attachment 1 of this invention is shown applied to a typical engine lathe comprising the bed 2 upon which is slidably mounted the carriage 3 on the usual ways 4, 5, and 6 for longitudinal movement thereon. On the carriage 3 is mounted a suitable apron 7 for effecting movement of the carriage and the cross slide 8 (when not turning tapers) slidably mounted on the usual dovetail ways 9 of the carriage. The usual compound rest 10, the tool post 11, and the tool holder 12 and cutting tool 13 are provided on the cross slide to operate on work rotated by the work spindle 14 of the headstock 15.

The cross feed screw 16 is journaled against axial movement in the cross feed screw carrier 17 by a pair of suitable pre-loaded ball bearings 18 fixed in the carrier 17 by the cap 19 held in place by the screws 20 and connected to the cross feed screw by the lock nut 21. This screw operates in the cross feed nut 22 fixed on the cross slide 8 and is telescopically connected by a splined connection 23 to the cross feed operating shaft 24 whereby the screw may be operated while at the same time providing an arrangement whereby the cross slide and screw may be bodily moved relative to the shaft 24 which is fixed against axial movement in the carriage 3. A draw bar 25 fixed to the carrier 17 by rivets 26 is adapted to be clamped to or unclamped from the cross slide 8 by a suitable clamp 27 so as to positively lock the carrier 17 to the cross slide to eliminate any backlash which might be present between the cross feed screw 16 and the nut 22 if they alone were relied upon when taper turning. The above arrangement just described is fully set forth in Patents 1,401,534; 1,442,660; and 1,442,661.

In order to prevent all displacement of the carrier 17 and the cross feed screw 16 axially while at the same time providing an anti-friction mounting for the carrier for free movement transversely of the lathe bed, slots 28 are formed in the side faces 29 of the carrier 17 into which nicely fit in rolling engagement the outer races 30 of combined radial and thrust ball bearings 31 carried on the studs 32 and 33 in the carriage 3. These studs have their portions 34 slightly eccentric with their portions 35 so as to effect very accurate setting of the bearings 30 against the carrier 17.

Fixed in the carrier 17 on the line VI—VI (Figure II) passing through the studs 32 and 33 is the stud 36 which has the guide bar follower assembly, shown particularly in Figure VIII, mounted to swivel on its portions 37 and also carrying the ball bearing 38 on its portion 39. This follower assembly comprises the side plates 40 which carry the studs 41 and the ball bearings 42. This assembly is adapted to ride in the slot formed by the surfaces 43 and 44 in the swiveling guide bar 45. It is to be noted that the bearing 38 engages the surface 44 while the bearings 42 engage the surface 43. The assembly is so designed that the distance across the bearings 38 and 42 is slightly greater than the distance between the surfaces 43 and 44 so that the assembly snugly fits between these surfaces under a preloaded condition to prevent all backlash between the guide bar 45 and the carrier 17.

The guide bar 45 is pivotally mounted on the pin 46 fixed in the guide bar slide or truck 47. A set over device comprising the knob 48 on the shaft 48a which has a pinion 49 cut on it may be placed in either of the holes 50 and engaged with the rack 51 fixed on the truck 47 to effect careful setting of the guide bar 45. An indicating arm 52 fixed on the guide bar 45 and operating over the index plate 53 facilitates the precise setting for the guide bar 45 for all ranges of taper that can be produced. Suitable clamping bolts 54 operating in the arcuate T-slots in the truck 47 serve to lock the guide bar 45 in adjusted position.

On the surfaces 56 of the carriage 3 is securely bolted the housing 57 by appropriate screws 58. The truck 47 is carried on the ball bearing rollers 59, 60, 61 and 62 which roll along the rails 63 formed on the housing 57. The rollers 59, 60 and 61 are carried on studs 64 fixed in the truck 47 while the roller 62 is carried on an eccentric stud 65 which may be adjusted so as to bring all of these rollers to proper engagement with the rails 63. The truck 47 is further guided in accurate parallel movement with that of the carriage along the bed by the ball bearing rollers 66, carried on adjustable eccentric studs 67 carried in the housing 57, which engage the vertical surfaces 68 of the truck 47. All of the studs 67 are adjustable to facilitate accurate setting of the truck 47 in exact parallelism with the carriage travel along the bed, suitable lock nuts 69 being provided to bind these studs in adjusted position.

The truck 47 is actuated by the movement of the carriage 3 along the bed as follows: Noting Figure V, on the bed 2 of the lathe is mounted a rack 70 by suitable screws 71 which is engaged by a pinion 72 formed integral with the shaft 73 journaled on ball bearings 74 and 75 carried in the axially movable sleeve 76 slidably carried in the bore 77 of the housing 57 and prevented from rotating therein by a suitable key 78 fixed in the sleeve 76 and slidingly engaging the keyway 79 formed in said housing 57. On the other end of the shaft 73 from the pinion 72 is a change gear 80 appropriately mounted on the splined end 81 by the nut 82 which gear in turn drives the change gear 83 appropriately mounted on the splined end 84 of the shaft 85 and held in place thereon by the nut 86, Figure IV. The shaft 85 is journaled on ball bearings 87 and 88 carried in the housing 57. On the inner end of this shaft 85 is fixed the rack pinion 89 which engages the actuating rack 90 fixed on the truck 47 by appropriate screws 91.

It can thus be seen that as the carriage 3 moves along the bed 2 of the lathe the pinion 72 will roll along the rack 70 rotating the shaft 73 which in turn will rotate the shaft 85 through the change gears 80 and 83 causing the pinion on the shaft 85 to operate in the rack 90 to actuate truck 47. By selecting the proper sized change gears 80 and 83 any desired rate of travel of the truck 47 relative to the rate of travel of the carriage 3 may be easily and quickly obtained. Preferably, it is found best to provide three combinations of change gears 80 and 83 which, taken in conjunction with the various settings of the guide bar 45 as indicated on the index plate 53, gives the entire range of tapers for the lathe from zero to 90° included angle or 45° angle with the center line of the lathe.

In Figure IX is shown the range and required change gears when the taper attachment, for example, is applied to a lathe capable of machining a piece of work 8" in diameter and 36" long. The method of selecting the change gears is clearly shown. In the drawings, 1 to 4½ ratio change gears are shown, the gear 80 being a 16 tooth gear driving the 72 tooth gear 83.

It is to be clearly noted that to set the taper attachment for any desired taper it is only necessary to select one of the three combinations of change gears indicated in Figure IX and to set the guide bar 45 as clearly indicated by the index plate 53.

And it is to be further noted that this entire mechanism is self-contained and carried by the lathe carriage for instant use anywhere along the lathe bed. There are no bed brackets or other supplementary mechanism which must be adjusted along the bed for each different position at which work is to be done as in former structures used in the past.

When it is desired to render the taper attachment inoperative, the pinion 72 is withdrawn from the rack 70 by sliding the sleeve 76 rearwardly by manipulating the lever 92 which rotates the shaft 93 journaled in the carriage 3 and the housing 57 and the pinion 94 fixed on its lower end which engages a rack 95 formed on the side of the sleeve 76. As soon as the pinion 72 has been withdrawn from the rack 70 the segmental gear teeth 96 formed in the sleeve 76 enter the rack 90 of the truck 47 so as to prevent movement of said truck on the rails 63. The change gear 80 is not moved out of engagement with the change gear 83 when the sleeve is moved rearwardly as above described. Thus the taper attachment is simultaneously rendered inoperative and its truck locked against movement by moving the lever 92, so that when the clamping device 27 is released the cross slide may be operated in the usual manner by manipulating the cross feed ball handle 97 or by power from the lathe apron 7.

Another significant feature about this arrangement as particularly shown in Figure V, is that point of application of power to the taper attachment is applied directly under the shear 6 of the bed 2 through the rack 70 rather than at a point far removed rearwardly from the bed as in former devices incorporating these features, thus minimizing the twisting and cocking of the lathe carriage that has been inherent in such former devices.

Having thus fully set forth and described our invention what we claim as new and desire to secure by United States Letters Patent is:

1. In a lathe, a bed, a carriage longitudinally movable on said bed, a taper attachment mounted on the carriage comprising a guide bar truck movable relative to the carriage longitudinally of the bed, an angularly adjustable guide bar on said truck for actuating the cross slide on said carriage, rack and pinion means associated with the bed of the lathe to effect movement of said guide bar truck by movement of said carriage, change gear mechanism interconnecting said rack and pinion means and said guide bar truck, and common means for simultaneously disengaging said pinion from said rack and locking said guide bar truck to said carriage.

2. In a lathe, a bed, a carriage longitudinally movable on said bed, a taper attachment mounted on the carriage comprising a guide bar truck movable relative to the carriage longitudinally of the bed, an angularly adjustable guide bar on said truck for actuating the cross slide on said carriage, means for effecting movement of said guide bar truck by movement of said carriage, and common means for simultaneously disengaging said pinion from said rack and locking said guide bar truck to said carriage.

3. In a lathe, a bed, a carriage longitudinally movable on said bed, a taper attachment mounted on the carriage comprising a guide bar truck movable relative to the carriage longitudinally of the bed, an angularly adjustable guide bar on said truck for actuating the cross slide on said carriage, a guide bar follower operating in the slot of said guide bar comprising three triangularly arranged rollers arranged to be wedged in the slot of said guide bar in a preloaded fashion preventing all movement of said follower perpendicularly of said slot.

4. In a lathe, a bed, a carriage longitudinally movable on said bed, a taper attachment mounted on the carriage comprising a guide bar truck movable relative to the carriage longitudinally of the bed, an angularly adjustable guide bar on said truck for actuating the cross slide on said carriage, a guide bar follower operating in the slot of said guide bar comprising a member carrying three triangularly arranged rollers, one roller contacting one side of said slot, the other two rollers contacting the other side of said slot, said rollers being so arranged as to fit tightly in said slot in a preloaded fashion.

5. In a lathe, a bed, a carriage longitudinally movable on said bed, a taper attachment mounted on the carriage comprising a guide bar movable relative to the carriage longitudinally of the bed, means connecting said guide bar to the cross slide of the lathe to effect movement thereof, means contained in said taper attachment, effective for any position of said carriage along the bed, to effect movement of said guide bar by movement of said carriage on said bed, and change gear mechanism interconnecting said last mentioned means and said guide bar to effect differential movement of said guide bar relative to the bed and carriage of said lathe.

6. In a lathe, a bed, a carriage longitudinally movable on said bed, a taper attachment mounted on the carriage comprising a guide bar truck movably mounted on four anti-friction rollers and guided by four anti-friction rollers on said carriage for movement relative to the carriage longitudinally of the bed, a guide bar on said truck having a slot in which operates a triangularly arranged preloaded anti-friction bearing follower, means connecting said follower to the cross slide of the carriage, and a pair of anti-friction bearings on the carriage to prevent sidewise displacement of said cross slide during movement of said guide bar, and means for actuating said guide bar truck during the movement of said carriage.

7. In a lathe, a bed, a carriage longitudinally movable on said bed, a taper attachment mounted on the carriage comprising a guide bar movable relative to the carriage longitudinally of the bed of the lathe, means for actuating said guide bar by the movement of the carriage along the bed comprising a shaft rotatably journaled on said carriage having a pinion engaging a rack fixed on said bed, a second shaft rotatably journaled in said carriage and connected by rack and pinion means to said guide bar, and change gear mechanism interconnecting said shafts.

8. In a lathe, a bed, a carriage longitudinally movable on said bed, a taper attachment mounted on the carriage comprising a guide bar movable relative to the carriage longitudinally of the bed of the lathe, means for actuating said guide bar by the movement of the carriage along the bed comprising a shaft rotatably journaled on said carriage having a pinion engaging a rack fixed on said bed, a second shaft rotatably journaled in said carriage and having a pinion engaging a rack on said guide bar, change gear mechanism interconnecting said shafts, and means for bodily moving said first mentioned shaft to withdraw its pinion from the rack on the bed and to lock the rack of the guide bar to said carriage.

HENRY C. PIERLE.
WM. F. GROENE.